US010261955B1

(12) United States Patent
Shivaswamy et al.

(10) Patent No.: US 10,261,955 B1
(45) Date of Patent: Apr. 16, 2019

(54) VERIFYING EFFECTS OF FEED COMPOSITION ON LONG-TERM ENGAGEMENT WITH CONTENT FEEDS

(71) Applicant: LinkedIn Corporation, Mountain View, CA (US)

(72) Inventors: Pannagadatta K. Shivaswamy, Sunnyvale, CA (US); Shaunak Chatterjee, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 336 days.

(21) Appl. No.: 15/222,391

(22) Filed: Jul. 28, 2016

(51) Int. Cl.
*G06F 16/2457* (2019.01)
*G06F 16/2458* (2019.01)
*G06F 16/9535* (2019.01)

(52) U.S. Cl.
CPC .... *G06F 16/2465* (2019.01); *G06F 16/24575* (2019.01); *G06F 16/9535* (2019.01)

(58) Field of Classification Search
CPC ......... G06F 17/30539; G06F 17/30528; G06F 17/30867; G06F 16/2465; G06F 16/24575; G06F 16/9535
USPC ...................................................... 707/776
See application file for complete search history.

(56) References Cited

U.S. PATENT DOCUMENTS

| 8,751,510 | B2 | 6/2014 | Rose et al. | |
|---|---|---|---|---|
| 2011/0161331 | A1* | 6/2011 | Chung | G06Q 30/02 707/751 |
| 2013/0290110 | A1* | 10/2013 | LuVogt | G06F 17/30867 705/14.66 |
| 2014/0279736 | A1* | 9/2014 | Glass | G06F 17/30029 706/12 |
| 2015/0332314 | A1* | 11/2015 | Chakraborty | G06Q 50/01 705/14.45 |
| 2016/0021213 | A1 | 1/2016 | Ruan et al. | |
| 2016/0134577 | A1 | 5/2016 | Owens et al. | |
| 2016/0321261 | A1* | 11/2016 | Spasojevic | G06F 17/3053 |
| 2016/0373396 | A1 | 12/2016 | Sorg | |
| 2017/0262532 | A1 | 9/2017 | Conover et al. | |
| 2017/0262632 | A1 | 9/2017 | Jaman | |
| 2017/0324799 | A1 | 11/2017 | Lebanon et al. | |

OTHER PUBLICATIONS

"Non Final Office Action Issued in U.S. Appl. No. 15/222,403", dated May 29, 2018, 12 Pages.
"Final Office Action Issued in U.S. Appl. No. 15/222,403 ", dated: Jan. 2, 2019, 13 pages.

* cited by examiner

*Primary Examiner* — Evan Aspinwall
(74) *Attorney, Agent, or Firm* — Park, Vaughan, Fleming & Dowler LLP; Chia-Hsin Suen

(57) ABSTRACT

The disclosed embodiments provide a system for improving long-term engagement with content feeds. During operation, the system obtains a factor associated with a change in a level of engagement with a content feed. Next, the system uses the factor to modulate a feed composition of the content feed for a first set of users. The system then verifies an effect of the factor on the level of engagement by comparing a first level of engagement of the first set of the users with the content feed with a second level of engagement of a second set of users with the content feed. Finally, the system uses the first and second levels of engagement with the content feed to select a value associated with the factor for use in modulating a subsequent feed composition of the content feed.

20 Claims, 7 Drawing Sheets

VERIFYING EFFECTS OF FEED COMPOSITION ON LONG-TERM ENGAGEMENT WITH CONTENT FEEDS

RELATED APPLICATION

The subject matter of this application is related to the subject matter in a co-pending non-provisional application by the same inventors as the instant application and filed on the same day as the instant application, entitled "Modulating Feed Composition to Improve Long-Term Engagement with Content Feeds," having Ser. No. 15/222,403, and filing date 28 Jul. 2016.

BACKGROUND

Field

The disclosed embodiments relate to filtering of digital content. More specifically, the disclosed embodiments relate to techniques for verifying effects of feed composition on long-term engagement with content feeds.

Related Art

Content feeds such as RSS (Really Simple Syndication) feeds and Atom feeds are mechanisms for presenting content to interested people (e.g., users or subscribers) without requiring them to manually access or retrieve the content from one or more content sources. For example, a social network may generate a news feed of photos, audio, video, documents, articles, posts, status updates, likes, comments, shares, mentions, trending content, and/or other types of content or social network interaction for each user accessing the social network. The user may then click on a posting of the content item within the news feed to navigate to a website on which the content item is hosted and/or access the entirety of the content item.

Moreover, the user experience with a content feed may be significantly impacted by the selection and ordering of content items in the content feed. For example, a provider of a content feed may risk user fatigue if a subscriber is presented with low-quality content items (e.g., spam), identical content items, content items that repeatedly cover the same subject, and/or content items that are not interesting or relevant to the user.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
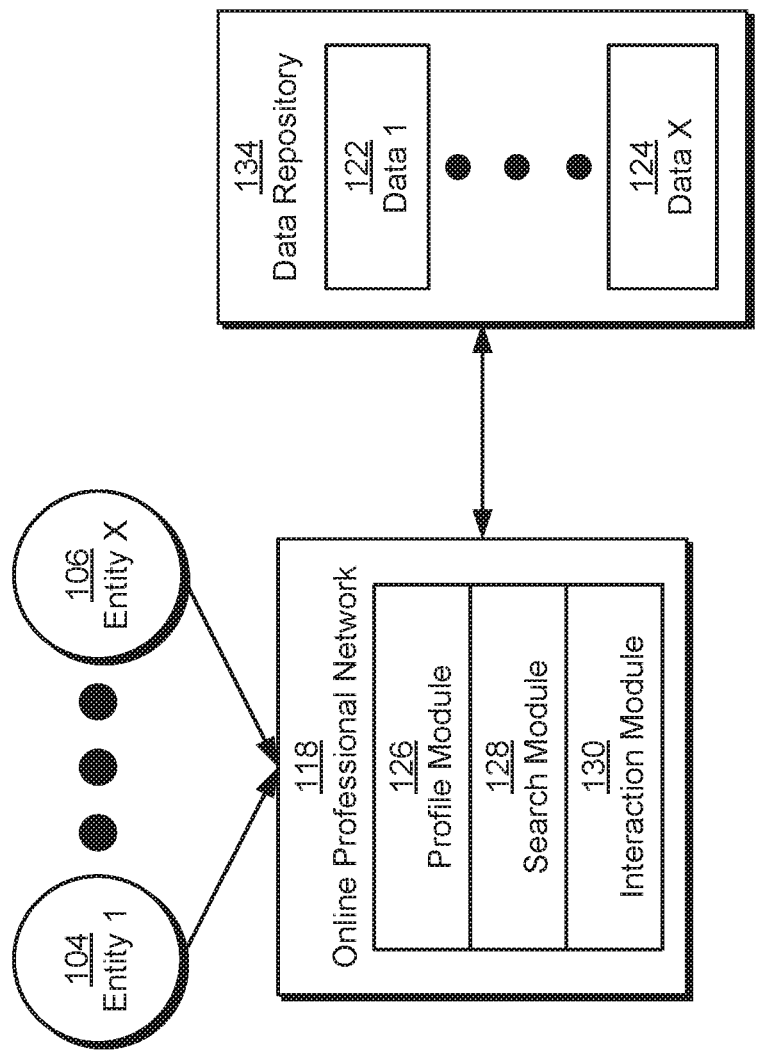
FIG. 1 shows a schematic of a system in accordance with the disclosed embodiments.

The disclosed embodiments provide a method, apparatus, and system for improving engagement with a content feed. As shown in FIG. 1, the content feed may be associated with an online professional network 118 that is used by a set of entities (e.g., entity 1 104, entity x 106) to interact with one another in a professional and/or business context.

The entities may include users that use online professional network 118 to establish and maintain professional connections, list work and community experience, endorse and/or recommend one another, search and apply for jobs, and/or perform other actions. The entities may also include companies, employers, and/or recruiters that use the online professional network to list jobs, search for potential candidates, provide business-related updates to users, advertise, and/or take other action.

The entities may use a profile module 126 in online professional network 118 to create and edit profiles containing information related to the entities' professional and/or industry backgrounds, experiences, summaries, projects, skills, and so on. The profile module may also allow the entities to view the profiles of other entities in the online professional network.

The entities may use a search module 128 to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature in the online professional network to search for profiles, jobs, and/or information by categories such as first name, last name, title, company, school, location, interests, relationship, industry, groups, salary, experience level, etc.

The entities may also use an interaction module 130 to interact with other entities on online professional network 118. For example, the interaction module may allow an entity to add other entities as connections, follow other entities, send and receive messages with other entities, join groups, and/or interact with (e.g., create, share, re-share, like, and/or comment on) posts from other entities.

Those skilled in the art will appreciate that online professional network 118 may include other components and/or modules. For example, the online professional network may include a homepage, landing page, and/or content feed that provides the latest postings, articles, and/or updates from the entities' connections and/or groups to the entities. Similarly, the online professional network may include features or mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, and/or other action performed by an entity in the online professional network may be tracked and stored in a database, data warehouse, cloud storage, and/or other data-storage mechanism providing the data repository.

Figure 2:
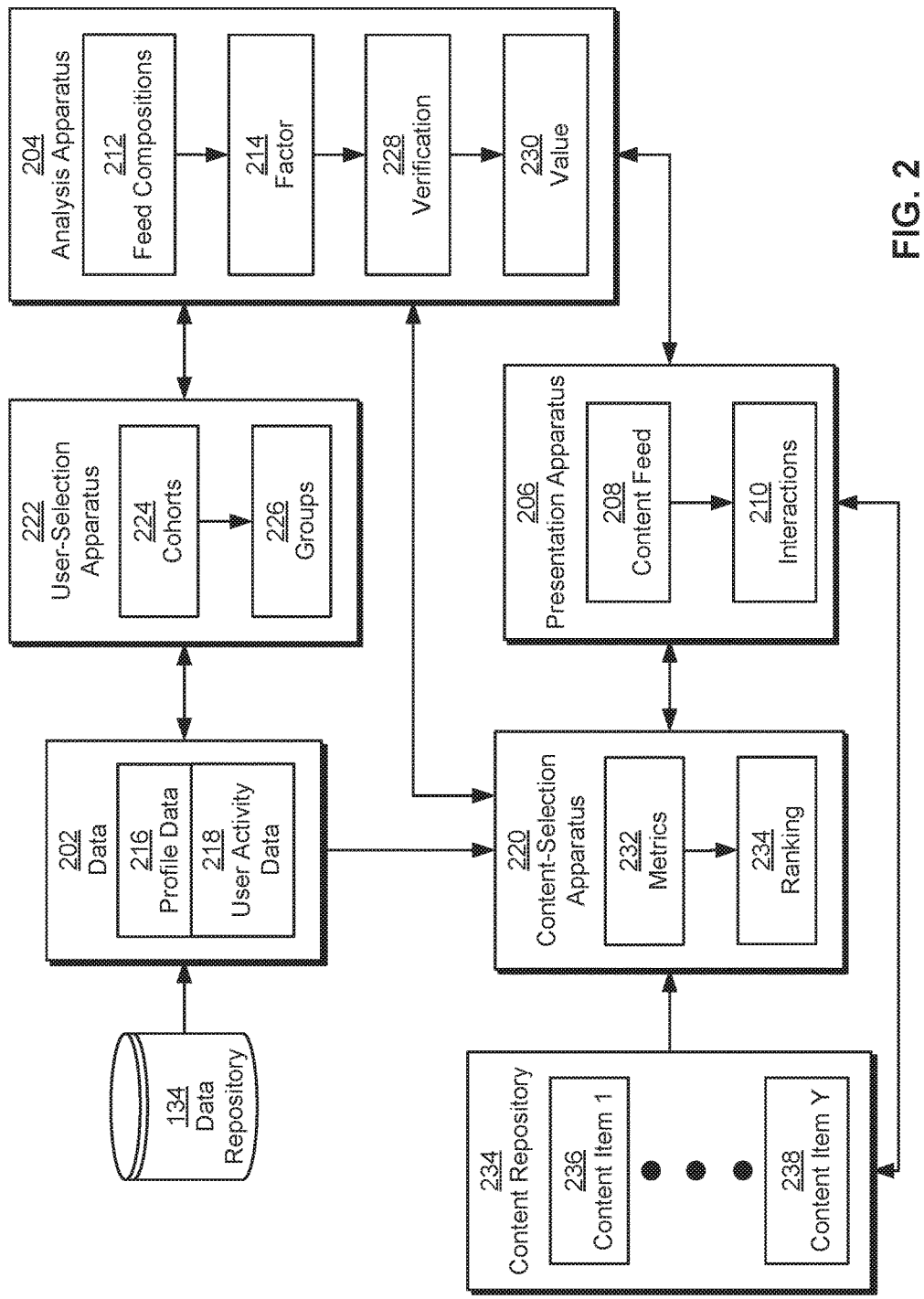
FIG. 2 shows a system for processing data in accordance with the disclosed embodiments.

As shown in FIG. 2, data repository 134 and/or another primary data store may be queried for data 202 that includes profile data 216 for members of a social network (e.g., online professional network 118 of FIG. 1), as well as user activity data 218 that tracks the members' activity within and/or outside the social network. The profile data may include data associated with member profiles in the social network. For example, profile data for an online professional network may include a set of attributes for each user, such as demographic (e.g., gender, age range, nationality, location, language), professional (e.g., job title, professional summary, employer, industry, experience, skills, seniority level, professional endorsements), social (e.g., organizations of which the user is a member, geographic area of residence), and/or educational (e.g., degree, university attended, certifications, publications) attributes. The profile data may also include a set of groups to which the user belongs, the user's contacts and/or connections, and/or other data related to the user's interaction with the social network.

Attributes of the members, which may be obtained from their profiles, may be matched to a number of member segments, with each member segment containing a group of members that share one or more common attributes. For example, member segments in the social network may be defined to include members with the same industry, location, company, company type, school, skills, level of seniority, job titles, level of reputation, level of influence, group membership, sets of connections, numbers of connections, levels of activity in the social network, and/or language.

Connection information in or associated with profile data 216 may additionally be combined into a graph, with nodes in the graph representing entities (e.g., users, schools, companies, locations, etc.) in the social network. In turn, edges between the nodes in the graph may represent relationships between the corresponding entities, such as connections between pairs of members, education of members at schools, employment of members at companies, following of a member or company by another member, business relationships and/or partnerships between organizations, and/or residence of members at locations.

User activity data 218 may include records of member interaction with one another and/or content items (e.g., content item 1 236, content item y 238) associated with the social network. For example, the user activity data may be used to track impressions, clicks, likes, dislikes, shares, hides, comments, posts, updates, conversions, and/or other user interaction with content in the social network. The user activity data may also track other types of activity, including connections, messages, and/or interaction with groups or events. Like profile data 216, the user activity data may be used to create a graph, with nodes in the graph representing social network members and/or content and edges between pairs of nodes indicating actions taken by members, such as creating or sharing articles or posts, sending messages, connection requests, joining groups, and/or following other entities.

The content items may include user profiles, job postings, user posts, status updates, advertisements, articles, images, audio, video, documents, and/or other types of content that can be accessed within or through the social network. Representations of the content items may be stored in a content repository 234 for subsequent retrieval and use. For example, content repository 234 may include an identifier, location (e.g., Uniform Resource Locator (URL)), metadata, and/or content for each content item that is created, posted, featured, and/or shared using the social network.

In turn, user activity data 218 and content repository 234 may be used to generate a content feed 208 containing information that may be pertinent to users of the social network. For example, a website and/or mobile application associated with a social network may include a feed of the latest activity and updates on the social network. Updates in the content feed of the social network may include posts, articles, scheduled events, impressions, clicks, likes, dislikes, shares, comments, mentions, views, updates, trending updates, conversions, and/or other activity or content by or about various entities (e.g., users, companies, schools, groups, skills, tags, categories, locations, regions, etc.). The feed updates may also include content items associated with the activities, such as user profiles, job postings, user posts, status updates, messages, sponsored content, event descriptions, articles, images, audio, video, documents, and/or other types of content from the content repository.

To improve the user experience with the social network, feed updates in content feed 208 may be selected and/or ordered based on the behavior, characteristics, and/or interests of members or related groups of members (e.g., connections, follows, schools, companies, group activity, member segments, etc.) in the social network. More specifically, a content-selection apparatus 220 may calculate a set of metrics 232 for the feed updates based on profile data 216 and/or user activity data 218. For example, the content-selection apparatus may calculate, for each member, a set of relevance scores representing the relevance of the feed updates to the member. The relevance scores may be based on recent activities and/or interests of the member; profile data 216 and/or one or more member segments of the member; user engagement with the feed updates within the member segment, the member's connections, and/or the social network; editorial input from administrative users associated with creating or curating content in the content feed; and/or sources of the feed updates. The metrics and/or relevance scores may also, or instead, include estimates of the member's probability of clicking on or otherwise interacting with the corresponding feed updates.

After metrics 232 are calculated, content-selection apparatus 220 may generate a ranking 234 of the feed updates by the metrics. For example, the content-selection apparatus may rank the feed updates by descending order of relevance score and/or estimated click probability, so that feed updates at the top of the ranking are most relevant to or likely to be clicked by the member and feed updates at the bottom of the ranking are least relevant to or likely to be clicked by the member. A presentation apparatus 206 may then generate content feed 208 from ranking 234 and the associated feed updates. For example, the presentation apparatus may order the feed updates according to their respective positions in the ranking and display the feed updates to the member as the member interacts with the social network through a web or mobile application.

Presentation apparatus 206 may also allow the member to perform one or more interactions 210 with the displayed feed updates. For example, the presentation apparatus may provide user-interface elements and/or mechanisms for clicking, liking, disliking, sharing, hiding, commenting, unfollowing, and/or otherwise interacting with feed updates in content feed 208. The interactions may be tracked and included in user activity data 218 for subsequent retrieval and use. By generating the content feed based on metrics that reflect relevance or likelihood of engagement for the user, the system of FIG. 2 may increase immediate engagement and/or interaction with feed updates in the content feed.

In one or more embodiments, the system of FIG. 2 also includes functionality to modulate content feed 208 in a way that improves long-term engagement with the content feed. Engagement with the content feed may be measured as a number of "engaged feed sessions," or user sessions with the content feed in which one or more interactions 210 take place. Engagement with the content feed may also, or instead, be based on other metrics, such as the number or duration of user sessions with the content feed, a number of interactions 210 with the content feed during a user session and/or given time period, and/or a number of impressions of feed updates in the content feed. In turn, long-term engagement may refer to engagement with the content feed (e.g., sessions with the content feed and/or positive interactions 210 with feed updates) over a number of days, weeks, or months instead of engagement with the content feed during a current session with the content feed.

More specifically, a user-selection apparatus 222 may analyze profile data 216 and/or user activity data 218 to identify one or more cohorts 224 of users (e.g., social network members) interacting with content feed 208. Each cohort may include a number of users that share one or more common attributes. For example, the cohorts may be created from users with similar levels of engagement with the content feed over a given period, users in the same member segments, and/or users with similar patterns of engagement with the content feed and/or social network.

Next, user-selection apparatus 222 may divide the cohorts 224 into two or more groups 226 of users based on a change in the users' level of engagement with the content feed. For example, each cohort may be split into groups of users that have increased engagement, decreased engagement, and unchanged engagement with the content feed in a subsequent period after the cohorts are formed.

After cohorts 224 and groups 226 are created, an analysis apparatus 204 may determine feed compositions 212 of content feed 208 for each group of users. For example, the analysis apparatus may create a distribution of impressions and/or interactions 210 of each group of users with different update types (e.g., posts, articles, job listings, advertisements, likes, shares, comments, follows, connections, group interactions, profile updates, profile views, mentions, trending updates, etc.) of feed updates in the content feed. The distribution may be created from data spanning an intermediate period that is prior to a final period in which changes in the users' level of engagement with the content feed are observed and subsequent to an initial period that is used to identify the cohorts. As a result, the distribution may reflect a period of user interaction with the content feed that subsequently affects the users' long-term engagement with the content feed.

Analysis apparatus 204 may then compare feed compositions 212 to identify a factor 214 associated with the change in engagement across groups 226. For example, the analysis apparatus may compare the distributions of impressions and/or actions associated with feed updates in content feed 208 across the groups to identify differences in the groups' exposure to and/or interaction with various update types in content feed 208. The analysis apparatus may then identify the factor as a correlation between the proportion of one or more update types in the feed compositions and the corresponding change in engagement with content feed 208. For example, the analysis apparatus may determine that one or more update types are associated with an increase in long-term engagement with the content feed, and one or more other update types are associated with a decrease in long-term engagement with the content feed. Using engagement and feed composition data to identify factors associated with changes in engagement with content feeds is described in further detail below with respect to FIG. 3.

After factor 214 is identified, analysis apparatus 204 may perform a verification 228 of the factor. For example, the analysis apparatus may conduct an empirical study that modulates the feed composition of content feed 208 for a first group according to the factor and does not modulate the feed composition of the content feed for a second group. To modulate the feed composition, the analysis apparatus and/or content-selection apparatus may adjust metrics 232 of feed updates and/or update types associated with the factor by an additive and/or multiplicative value 230. While the feed composition of the first group is modulated, the analysis apparatus may monitor the levels of engagement of the two groups. If the levels of engagement differ by a statistically significant amount that is in line with the correlation represented by the factor, the effect of factor on engagement with the content feed may be verified. The analysis apparatus may then use the results of the empirical study to update the value, and the value may be used to modulate subsequent feed compositions of the content feed in a way that increases long-term engagement with the content feed. Verifying factors associated with changes in engagement with content feeds is described in further detail below with respect to FIG. 4.

By identifying factors linking different feed compositions 212 to changes in long-term engagement with content feed 208, the system of FIG. 2 may characterize the value delivered by different types of feed updates in the content feed. In turn, the characterized value may be used to vary the feed compositions in a way that improves the long-term engagement with the content feed and increases the value and quality of the content feed.

Those skilled in the art will appreciate that the system of FIG. 2 may be implemented in a variety of ways. For example, data repository 134, content repository 234, analysis apparatus 204, presentation apparatus 206, user-selection apparatus 222, and content-selection apparatus 220 may be provided by a single physical machine, multiple computer systems, one or more virtual machines, a grid, one or more clusters, one or more databases, one or more filesystems, and/or a cloud computing system. The functionality of analysis apparatus 204, presentation apparatus 206, user-selection apparatus 222, and content-selection apparatus 220 may additionally be implemented together and/or separately by one or more hardware and/or software components and/or layers.

Figure 3:
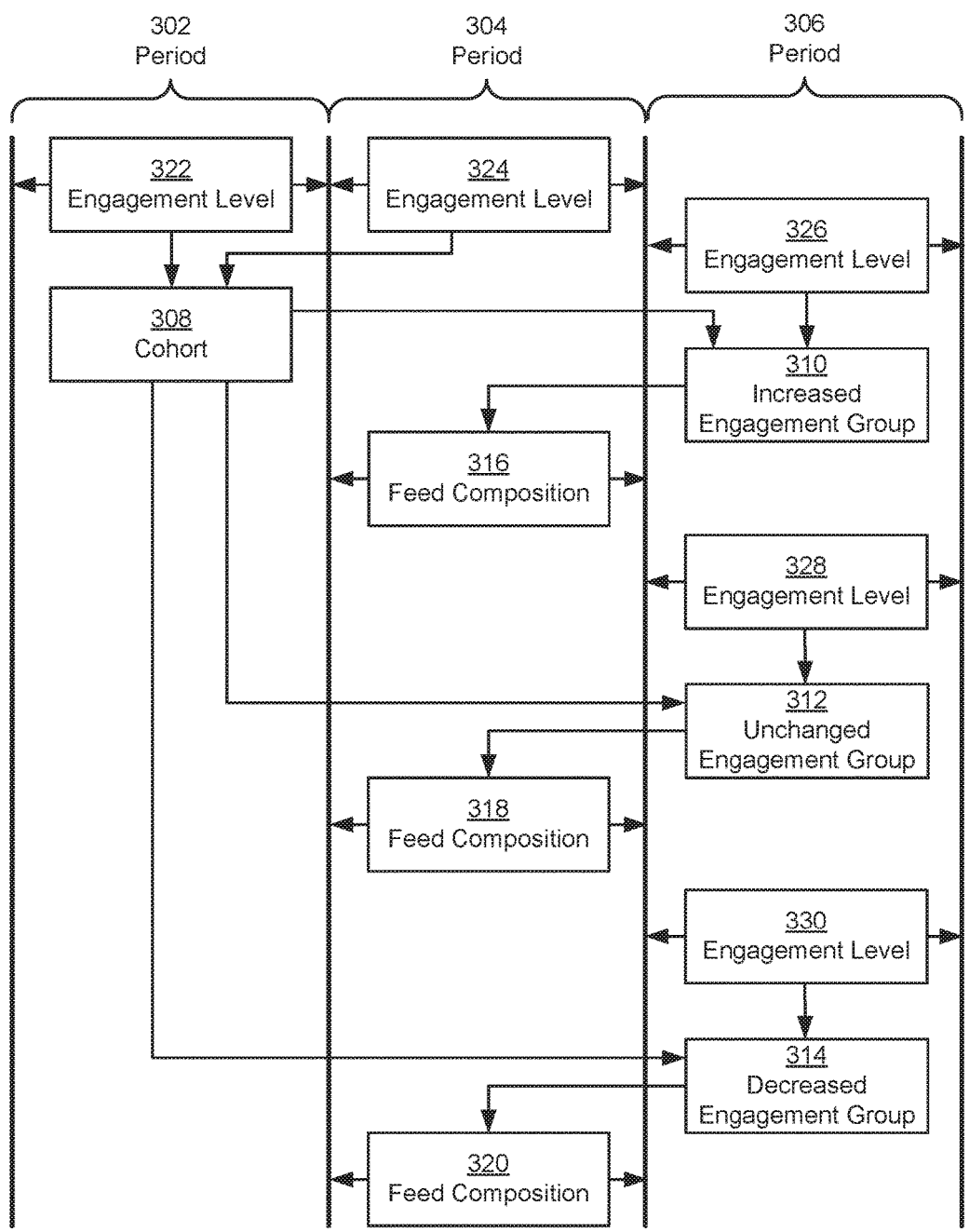
FIG. 3 shows the analysis of data during identification of a factor associated with a change in the level of engagement with a content feed in accordance with the disclosed embodiments.

FIG. 3 shows the analysis of data during identification of a factor associated with a change in the level of engagement with a content feed (e.g., content feed 208 of FIG. 2) in accordance with the disclosed embodiments. As shown in FIG. 3, data associated with the content feed may be analyzed over three consecutive periods 302-306. For example, the data may span three consecutive two-week periods. The data may be collected over the periods as users interact with the content feed, or the data may be obtained as historic data collected during previous periods of the same duration.

The analysis may begin with identification of a cohort 308 of users from an engagement level 322 of the users over a first period 302. For example, the cohort may include users who engage in at least one "engaged feed session" per week. In a second example, the cohort may include users that fall into a range of engaged feed sessions per week (e.g., 1-2 engaged feed sessions per week, 3-4 engaged feed sessions per week, etc.). In a third example, the cohort may also include users in the same member segment in a social network and/or users with similar patterns of engagement with the content feed.

Cohort 308 may also be identified using an engagement level 324 of the users over a second period 304 following the first period 302. For example, the cohort may include users with engagement levels over period 304 that do not deviate more than 50% from the users' engagement level 322 over period 302.

Next, cohort 308 may be divided into three groups of users based on engagement levels 326-330 of the users over a third period 306 following the first and second periods 302-304. An increased engagement group 310 may include users from cohort 308 with an increased engagement level 326 in period 306 compared with the corresponding engagement level 322 in period 302. An unchanged engagement group 312 may include users from cohort 308 with an unchanged engagement level 328 in period 306 when compared with engagement level 322. A decreased engagement group 314 may include users from cohort 308 with a decreased engagement level 330 in period 306 when compared with engagement level 322.

For example, the increased engagement group may contain users with engagement levels in period 306 that are more than 90% higher than their engagement levels in period 302, the decreased engagement group may contain users with engagement levels in period 306 that are more than 90% lower than their engagement levels in period 302, and the unchanged engagement group may contain users with engagement levels in period 306 that are within 50% of their engagement levels in period 302.

After the three groups are created, a feed composition (e.g., feed compositions 316-320) of the content feed is determined for each of the groups using data from period 304. The feed composition may characterize the group's exposure to and/or interaction with different update types in the content feed over period 304. For example, the feed composition may include an impression distribution that specifies, for each update type in the content feed, the percentage or proportion of feed updates of that update type viewed by users in the group over period 304 (e.g., 3% of all feed updates shown to the group over the period is sponsored content). The feed composition may also, or instead, include an action distribution that indicates, for each update type, the percentage or proportion of interactions with feed updates of that update type from users in the group over period 304 (e.g., 5% of all clicks on feed updates by the group over the period are on trending articles).

Feed compositions 316-320 may then be compared to identify one or more factors that may contribute to differences in engagement levels 326-330. For example, the impression and/or action distributions of the groups over period 304 may be compared to identify differences in the percentages and/or proportions of update types viewed or clicked by users in the groups. The differences may then be correlated with the different engagement levels 326-330 in period 306 to identify the factors as positive or negative correlations between proportions of update types in the feed composition and the long-term engagement of the users with the content feed. Values associated with the factors may then be verified and used to modulate subsequent feed compositions in the content feed, as described in further detail below with respect to FIG. 4.

Those skilled in the art will appreciate that data associated with periods 302-306 may be analyzed in different ways to identify factors that affect engagement with the content feed. In one exemplary analysis, cohort 308 may be split into two or more groups of users based on the users' exposure to or interaction with different feed compositions in period 304. For example, the cohort may be split into a treatment group and a control group, with the feed composition of the treatment group over period 304 containing a higher proportion of sponsored content than the feed composition of the control group over the period. The engagement levels of the two groups over period 306 may then be compared to identify a correlation between the proportion of sponsored content in the feed composition and the resulting change in engagement with the content feed.

Figure 4:
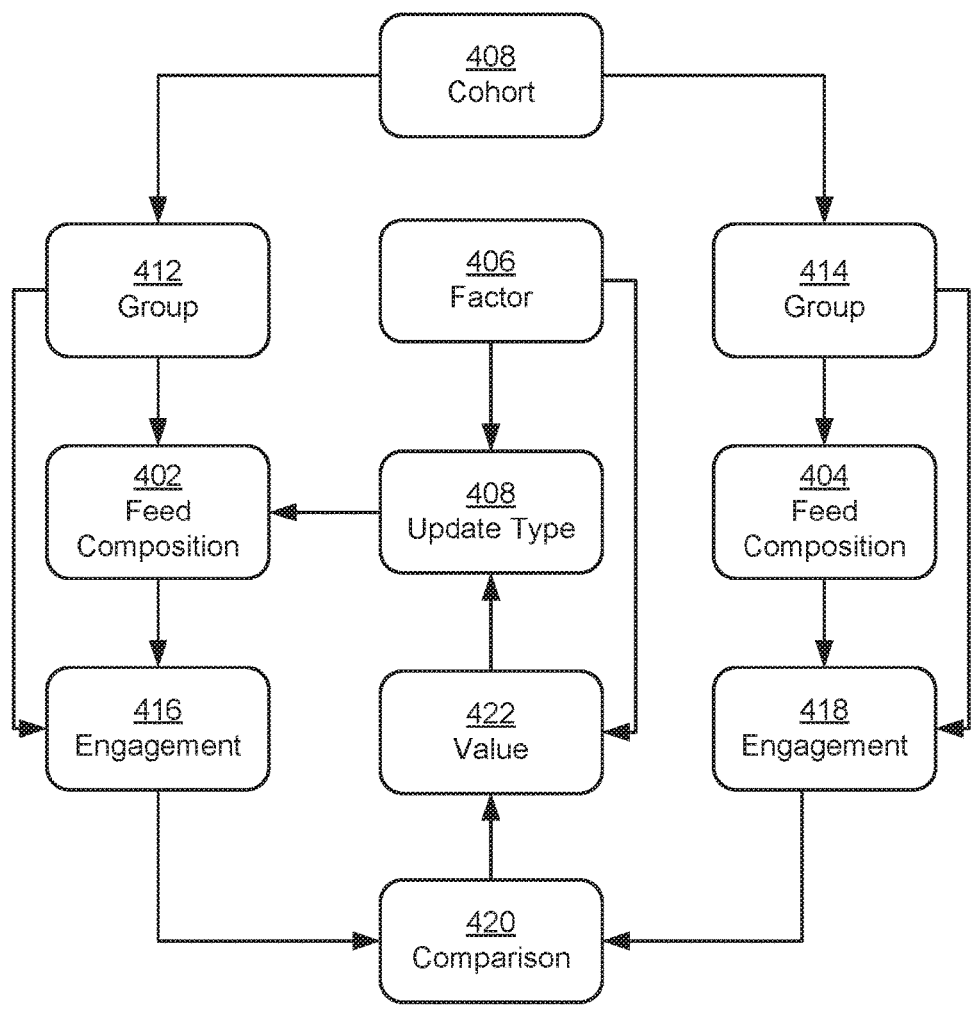
FIG. 4 shows the verification of a factor associated with a change in the level of engagement with a content feed in accordance with the disclosed embodiments.

FIG. 4 shows the verification of a factor 406 associated with a change in the level of engagement with a content feed (e.g., content feed 208 of FIG. 2) in accordance with the disclosed embodiments. As described above, the factor may indicate a correlation between a proportion of an update type in the feed composition of the content feed and the change in engagement level with the content feed. For example, the factor may link an increase in the display of advertisements in the content feed to a decrease in engagement with the content feed. As a result, the factor may be verified by modulating feed composition 402 of the content feed for a first group 412 of users and comparing an engagement 416 of the first group with the content feed with an engagement 418 of a second group 414 with a content feed that has an unmodulated feed composition 404.

Groups 412-414 may be selected from a cohort 408 of users. For example, the cohort may be generated using data that was previously used to identify factor 406, as discussed above with respect to FIG. 3. Alternatively, the cohort may be generated from a separate set of data to include users with similar patterns and/or levels of engagement with the content feed and/or users in the same member segment. After the cohort is generated, the cohort may be separated into two groups of equal or unequal size.

Next, factor 406 is used to modulate feed composition 402 for group 412, while feed composition 404 for group 414 remains unchanged. For example, feed compositions of the two groups may differ during an empirical study for verifying the effect of the factor on a change in engagement level with the content feed.

As shown in FIG. 4, a value 422 of factor 406 may be applied to an update type 408 associated with factor 406 to boost or reduce the proportion of the update type in feed composition 402. For example, the proportion of the update type may be reduced in the feed composition if the factor associates the update type with a decrease in engagement with the content feed. Conversely, the proportion of the update type may be increased in the feed composition if the factor links the update type with an increase in engagement with the content feed. To boost the update type in an action distribution for the content feed, a metric and/or score used to rank feed updates of the update type may be multiplied by a value that is greater than 1. To reduce the update type in the action distribution, the metric and/or score may be multiplied by a value that is less than 1. To boost the update type in an impression distribution for the content feed, a positive value may be added to the metric and/or score. To reduce the update type in the impression distribution, a negative value may be added to the metric and/or score. To adjust both the action and impression distributions in the content feed, the metric and/or score may be multiplied by a first factor associated with the action distribution and subsequently summed with a second factor associated with the impression distribution.

While feed composition 402 is modulated, engagement 416 of group 412 with the modulated feed composition may be monitored, along with engagement 418 of group 414 with an unmodulated feed composition 404. A comparison 420 of the levels of engagement of the two groups may then be made to verify factor 406. For example, the factor may be verified with a statistically significant result that identifies a corresponding increase or decrease in level of engagement between the two groups after group 412 has been exposed to the modulated feed composition.

After factor 406 is verified, value 422 may be updated based on engagement 416-418. For example, the value of the factor may be selected to produce a certain amount of change in a subsequent feed composition (e.g., impression distribution, action distribution, etc.) of the content feed, which results in a corresponding change in engagement level with the content feed.

As mentioned above, value 422 may be added to a metric for ranking feed updates in the content feed to change the impression distribution of the content feed, or value 422 may be multiplied by the metric to change the action distribution of the content feed. For example, the content feed may be generated from a ranking of n feed updates with descending numeric scores of $S_1, \ldots, S_n$. For each feed update x of a given update type associated with the factor, the score of the feed update may be modified to be $S_x+c$, where c represents an additive value of the factor, to change the proportion of the update type in the impression distribution of the content feed. The score of the feed update may alternatively be modified to be $S_x*c'$, where c' represents a multiplicative value of the factor, to change the proportion of the update type in the action distribution of the content feed. If the factor positively correlates the change in engagement level with the proportion of the update type in the feed distribution (e.g., an increase in the proportion of the update type in the feed distribution is correlated with an increase in engagement), the value of c may be positive, and the value of c' may be greater than 1. Thus, the value of the factor may increase the score, which in turn may improve the position of the feed update in the ranking and increase the visibility of the feed update in the content feed. If the factor negatively correlates the change in engagement level with the amount of the update type in the content feed (e.g., a decrease in the proportion of the update type in the feed distribution is correlated with an increase in engagement), the value of c may be negative, and the value of c' may be less than 1. Consequently, the value of the factor may decrease the score and lower the position of the feed update in the ranking, thereby decreasing the visibility of the feed update in the content feed.

Value 422 may additionally be calibrated based on the observed difference in engagement 416-418 between groups 412-414 and/or the previous value of factor 406 used to modulate the feed composition for group 412. For example, the magnitude of the value may be higher if a statistically significant change in level of engagement is linked to a greater difference in proportions of the update type in feed compositions 402-404 and lower if the change in level of engagement is linked to a smaller difference in proportions of the update type in the feed compositions.

After value 422 is determined, the value may be used to modulate a subsequent feed composition of the content feed for additional users, independently of users in groups 412-414. For example, the value may be used to increase or decrease the proportion of the corresponding update type in the content feed in a way that improves the long-term engagement of some or all users associated with factor 406 with the content feed. In turn, the content feed may provide value in the form of immediate engagement with certain feed updates, as well as in increased numbers of user sessions and/or duration of engagement with the content feed over time.

Figure 5:
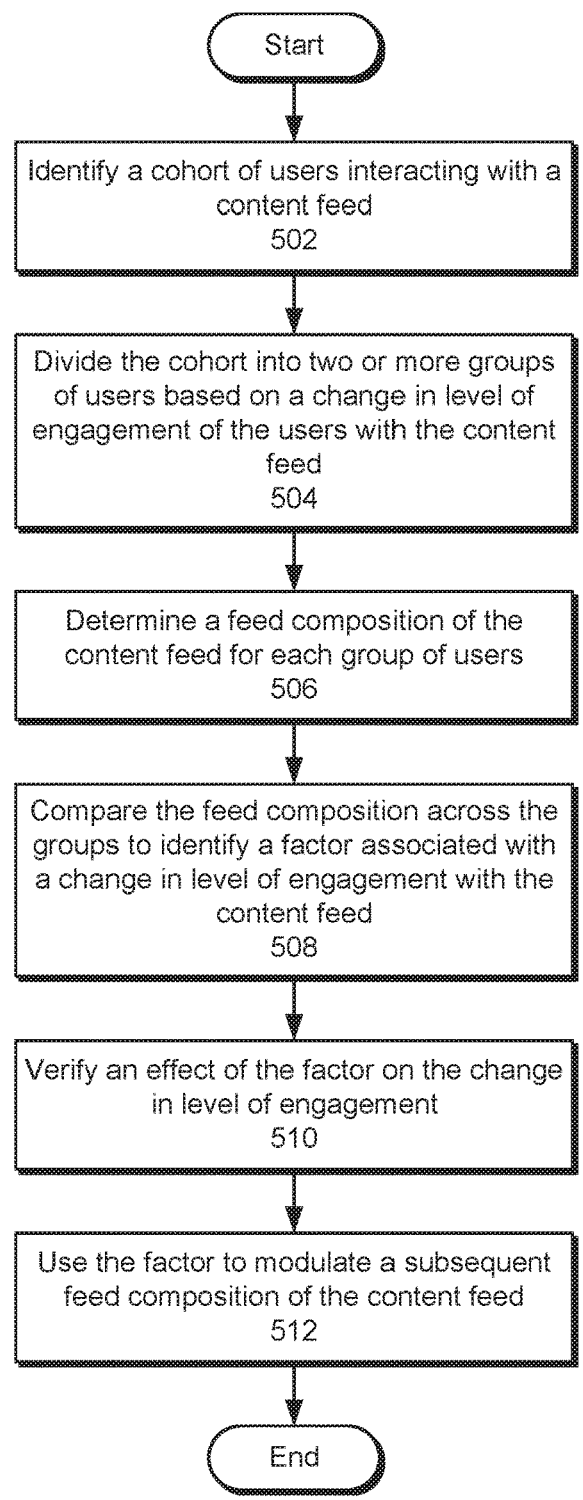
FIG. 5 shows a flowchart illustrating the process of improving long-term engagement with a content feed in accordance with the disclosed embodiments.

FIG. 5 shows a flowchart illustrating the process of improving long-term engagement with a content feed in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a cohort of users interacting with the content feed is identified (operation 502). The cohort may be identified from users with similar levels of engagement with the content feed over an initial period. For example, data associated with user interaction with the content feed may be obtained over a six-week period. A subset of the data may be used to generate the cohort from users with similar levels of engagement with the content feed over the first two weeks of the six-week period. Each user's level of engagement may be determined based on a metric such as the number of sessions with one or more interactions with the content feed. Users in the cohort may also be selected to be in the same member segment, have similar engagement patterns with the content feed, and/or share other common attributes with one another.

Next, the cohort is divided into two or more groups of users based on a change in level of engagement of the users with the content feed (operation 504). Continuing with the previous example, the cohort may be divided into a group with an increased level of engagement with the content feed, a group with a decreased level of engagement with the content feed, and a group with an unchanged level of engagement with the content feed. The change in level of engagement may be identified over a final period following the initial period, such as the last two weeks of a six-week period spanned by the collected data.

A feed composition of the content feed is then determined for each group of users (operation 506). Continuing with the previous example, the feed composition may be determined over an intermediate period between the initial and final periods, such as the middle two weeks of a six-week period spanned by data associated with user interaction with the content feed. The feed composition may include an impression distribution that provides a breakdown of the content feed into proportions of update types viewed by the group over the intermediate period. The feed composition may also, or instead, include an action distribution that provides a breakdown of feed updates in the content feed into proportions of update types associated with positive interactions (e.g., clicks, likes, comments, shares, etc.) over the intermediate period.

The feed composition is also compared across the groups to identify a factor associated with a change in level of engagement with the content feed (operation 508). For example, differences in the feed composition between each pair of groups (e.g., decreased engagement and unchanged engagement, increased engagement and unchanged engagement, decreased engagement and increased engagement) may be identified as the difference in proportion of each update type between the feed compositions of the pair (e.g., a 5% difference in views of trending updates between the two groups). The factor may then be identified as a correlation between the proportion of a given update type and the change in level of engagement with the content feed, as reflected by the differences in engagement between the two groups. After the factor is identified, an effect of the factor on the change in level of engagement is verified (operation 510), as described in further detail below with respect to FIG. 6.

Finally, the factor is used to modulate a subsequent feed composition of the content feed (operation 512). For example, a value associated with the factor may be added to a metric used to rank feed updates in the content feed to modulate an impression distribution of the content feed. In another example, the metric may be multiplied by the value to modulate an action distribution of the content feed. By changing the presence and/or visibility of certain feed updates in the content feed, the factor may improve long-term engagement with the content feed.

Figure 6:
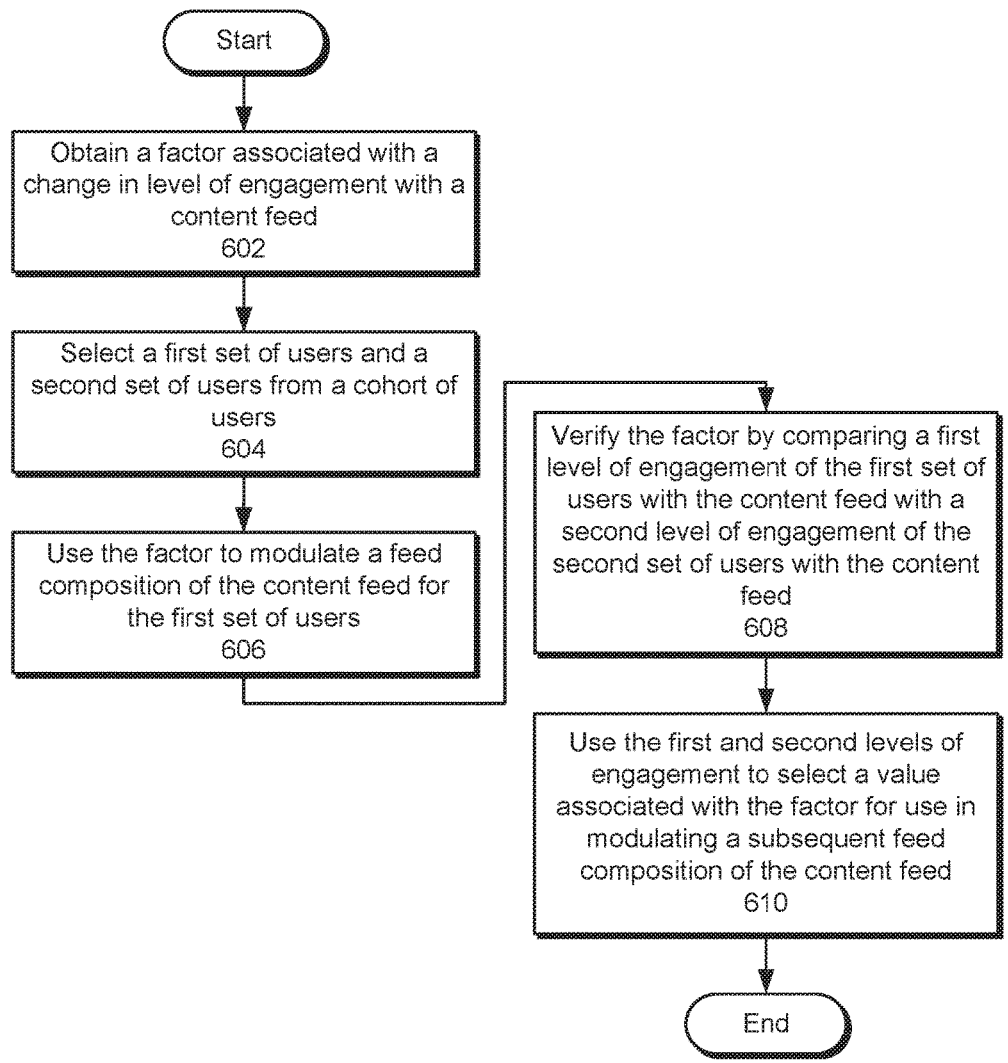
FIG. 6 shows a flowchart illustrating the process of verifying an effect of feed composition on long-term engagement with a content feed in accordance with the disclosed embodiments.

FIG. 6 shows a flowchart illustrating the process of verifying an effect of feed composition on long-term engagement with a content feed in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, a factor associated with a change in a level of engagement with a content feed is obtained (operation 602), as described above with respect to FIG. 5 for example. Next, a first set of users and a second set of users are selected from a cohort of users (operation 604). For example, the first and second sets of users may be selected as treatment and control groups from a cohort generated during analysis of data for identifying the factor. In another example, the first and second sets of users may generally be selected from a cohort of users with similar levels of engagement with the content feed over a pre-specified period, users in the same member segment of a social network, and/or users with similar patterns of engagement with the content feed.

The factor is then used to modulate a feed composition of the content feed for the first set of users (operation 606). For example, the proportion of an update type associated with the factor may be boosted or decreased in the content feed of the first set of users. In addition, the proportion of the update type may be increased or decreased in a way that is correlated with an increase in the level of engagement with the content feed, as indicated by the factor.

The factor is verified by comparing a first level of engagement of the first set of users with the content feed with a second level of engagement of the second set of users with the content feed (operation 608). For example, differences in the overall engagement of the first and second sets of users with the content feed may be correlated with the differences in feed composition for the two sets of users to verify the effect of the factor on the level of engagement with the content feed.

Finally, the first and second levels of engagement are used to select a value associated with the factor for use in modulating a subsequent feed composition of the content feed (operation 610). For example, the value may be scaled to reflect the magnitude of the effect of a given update type on long-term engagement with the content feed. In turn, the value may produce a certain amount of change in the subsequent feed composition. The value may then be applied to metrics used to rank feed updates in the content feed in a way that increases the long-term engagement with the content feed, as discussed above.

Figure 7:
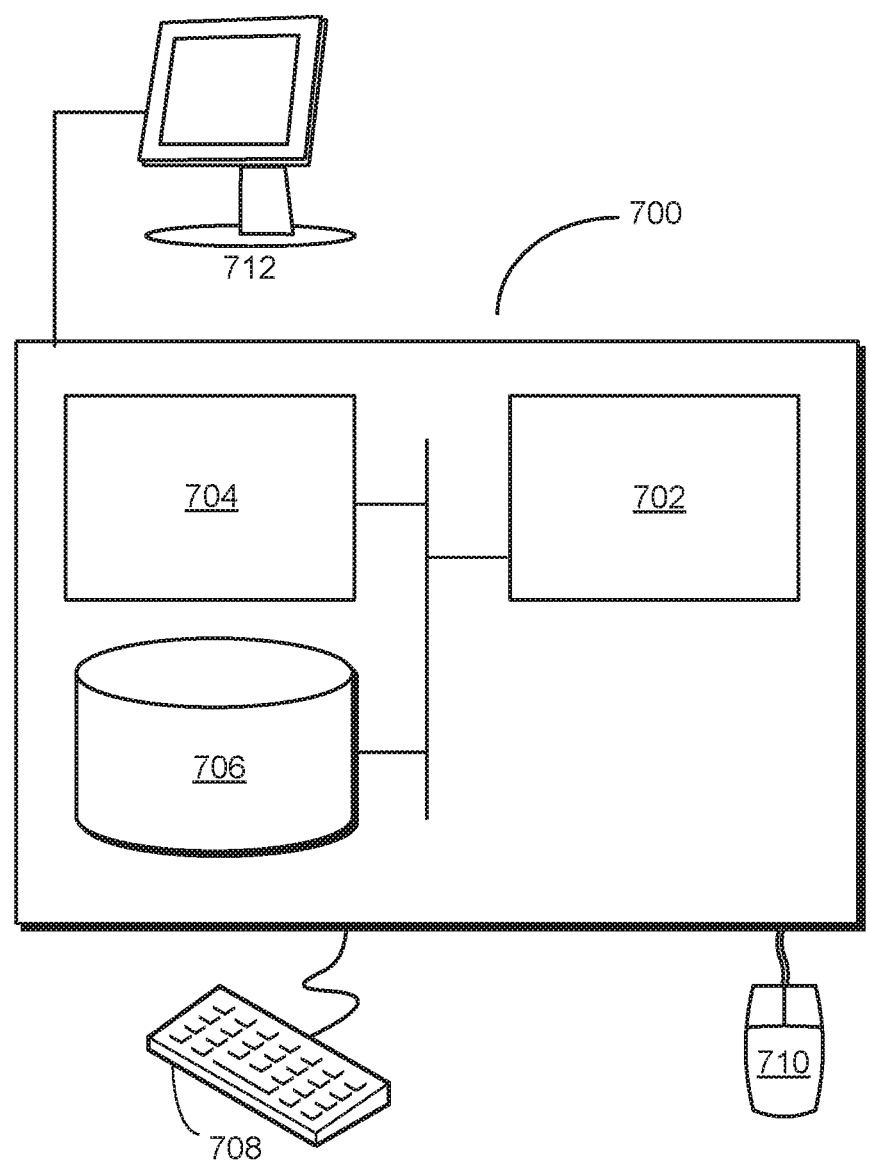
FIG. 7 shows a computer system in accordance with the disclosed embodiments.

FIG. 7 shows a computer system 700. Computer system 700 includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for improving long-term engagement with a content feed. The system may include a user-selection apparatus, an analysis apparatus, and a presentation apparatus, some or all of which may alternatively be termed or implemented as a module, mechanism, or other type of system component. The user-selection apparatus may identify a cohort of users interacting with a content feed and divide the cohort into two or more groups of users based on a change in a level of engagement of the users with the content feed. Next, the analysis apparatus may determine, for each group of users in the two or more groups, a feed composition of the content feed for the group. The analysis apparatus may then compare the feed composition across the two or more groups of users to identify a factor associated with the change in the level of engagement with the content feed. Finally, the presentation apparatus may use the factor to modulate a subsequent feed composition of the content feed.

The system may also, or instead, include functionality to verify the effects of feed composition on long-term engagement with content feeds. First, the user-selection apparatus may select a first set of users and a second set of users from a cohort of users. Next, the analysis apparatus may obtain the factor associated with a change in a level of engagement with a content feed and use the factor to modulate a feed composition of the content feed for a first set of users. The analysis apparatus may then verify an effect of the factor on the level of engagement by comparing a first level of engagement of the first set of the users with the content feed with a second level of engagement of a second set of users with the content feed. Finally, the analysis apparatus may use the first and second levels of engagement with the content feed to select a value associated with the factor for use in modulating a subsequent feed composition of the content feed.

In addition, one or more components of computer system 700 may be remotely located and connected to the other components over a network. Portions of the present embodiments (e.g., analysis apparatus, presentation apparatus, user-selection apparatus, content-selection apparatus, data repository, content repository, etc.) may also be located on different nodes of a distributed system that implements the embodiments. For example, the present embodiments may be implemented using a cloud computing system that generates a content feed for a set of remote members of a social network to improve the long-term engagement of the members with the content feed.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   obtaining a factor associated with a change in level of engagement with a content feed by:
      dividing a cohort of users into two or more engagement groups based on a change in level of engagement of the users with the content feed;
      determining, for each group in the two or more engagement groups of users, a feed composition of the content feed for the group; and
      comparing the feed compositions across the two or more engagement groups to identify the factor associated with the change in level of engagement with the content feed;
   using the factor to modulate a feed composition of the content feed for a first engagement group of users among the two or more engagement groups of users, wherein modulating the feed composition includes adjusting a proportion of at least type of content item in the content feed;
   verifying, by one or more computer systems, an effect of the factor on the level of engagement by comparing a first level of engagement of the first engagement group of users with the content feed with a second level of engagement of a second engagement group of users among the two or more engagement groups of users with the content feed; and
   using the first and second levels of engagement with the content feed to select a value associated with the factor for use in modulating a subsequent feed composition of the content feed.

2. The method of claim 1, wherein the cohort is selected to comprise at least one of:
   users with similar levels of engagement with the content feed over a pre-specified period; and
   users in a member segment of a social network.

3. The method of claim 2, wherein the member segment comprises at least one of:
   a location;
   an industry;
   a company;
   an activity level in the social network;
   a job title;
   a seniority; and
   a number of connections in the social network.

4. The method of claim 1, wherein the factor comprises a correlation between a proportion of an update type in the feed composition and the change in the level of engagement with the content feed.

5. The method of claim 4, wherein using the factor to modulate the feed composition of the content feed for the first engagement group of users comprises:
   when the proportion of the update type is correlated with a decrease in the level of engagement with the content feed, reducing the proportion of the update type in the feed composition; and
   when the proportion of the update type is correlated with an increase in the level of engagement with the content feed, increasing the proportion of the update type in the feed composition.

6. The method of claim 1, wherein using the first and second levels of engagement with the content feed to select the value of the factor for use in modulating the subsequent feed composition of the content feed comprises:
   selecting the value associated with the factor to produce an amount of change in the subsequent feed composition.

7. The method of claim 1, wherein modulating the subsequent feed composition of the content feed comprises at least one of:
   adding the factor to a metric used to rank feed updates in the content feed to modulate an impression distribution of the content feed; and
   multiplying the metric by the factor to modulate an action distribution of the content feed.

8. The method of claim 1, wherein the level of engagement with the content feed comprises:
   a number of sessions with one or more interactions with the content feed.

9. The method of claim 1, wherein the content feed comprises at least one of:
   a post;
   an article;
   a job listing;
   a like;
   a share;
   a comment;
   a follow;
   a connection;
   an interaction with a group;
   a profile update;

a profile view;
an event;
a mention; and
a trending update.

10. An apparatus, comprising:
one or more processors; and
memory storing instructions that, when executed by the one or more processors, cause the apparatus to:
obtain a factor associated with a change in level of engagement with a content feed by:
dividing a cohort of users into two or more engagement groups based on a change in level of engagement of the users with the content feed;
determining, for each group in the two or more engagement groups of users, a feed composition of the content feed for the group; and
comparing the feed compositions across the two or more engagement groups to identify the factor associated with the change in level of engagement with the content feed;
use the factor to modulate a feed composition of the content feed for a first engagement group of users among the two or more engagement groups of users, wherein modulating the feed composition includes adjusting a proportion of at least one type of content item in the content feed;
verify an effect of the factor on the level of engagement by comparing a first level of engagement of the first engagement group of users with the content feed with a second level of engagement of a second engagement group of users among the two or more engagement groups of users with the content feed; and
use the first and second levels of engagement with the content feed to select a value associated with the factor for use in modulating a subsequent feed composition of the content feed.

11. The method of claim 1, wherein the two or more engagement groups of users comprise:
a first group with an increased level of engagement with the content feed;
a second group with a decreased level of engagement with the content feed; and
a third group with an unchanged level of engagement with the content feed.

12. The method of claim 1, wherein:
the content feed includes multiple types of content items; and
a feed composition for a given engagement group comprises one or more of:
an impression distribution comprising proportions of each type of content item displayed to members of the given engagement group as part of the content feed; and
an action distribution comprising proportions of each type of content item in the content feed with which members of the given engagement group interacted.

13. The method of claim 1, wherein:
the first level of engagement of the first engagement group reflects engagement with the modulated feed composition; and
the second level of engagement of the second engagement group reflects engagement of the unmodulated feed composition.

14. The apparatus of claim 10, wherein the cohort is selected to comprise at least one of:

users with similar levels of engagement with the content feed over a pre-specified period; and
users in a member segment of a social network.

15. The apparatus of claim 10, wherein the factor comprises a correlation between a proportion of an update type in the feed composition and the change in the level of engagement with the content feed.

16. The apparatus of claim 15, wherein using the factor to modulate the feed composition of the content feed for the first set of users comprises:
when the proportion of the update type is correlated with a decrease in the level of engagement with the content feed, reducing the proportion of the update type in the feed composition; and
when the proportion of the update type is correlated with an increase in the level of engagement with the content feed, increasing the proportion of the update type in the feed composition.

17. The apparatus of claim 10, wherein using the first and second levels of engagement with the content feed to select the value of the factor for use in modulating the subsequent feed composition of the content feed comprises:
selecting the value associated with the factor to produce an amount of change in the subsequent feed composition.

18. A system, comprising:
a user-selection module comprising a non-transitory computer-readable medium comprising instructions that, when executed, cause the system to select a first engagement group of users and a second engagement group of users from a cohort of users; and
an analysis module comprising a non-transitory computer-readable medium comprising instructions that, when executed, cause the system to:
obtain a factor associated with a change in level of engagement with a content feed by:
determining, for each group in the two or more engagement groups of users, a feed composition of the content feed for the group; and
comparing the feed compositions across the two or more engagement groups to identify the factor associated with the change in level of engagement with the content feed;
use the factor to modulate a feed composition of the content feed for a first engagement group of users among the two or more engagement groups of users, wherein modulating the feed composition includes adjusting a proportion of at least one type of content item included in the content feed;
verify an effect of the factor on the level of engagement by comparing a first level of engagement of the first engagement group of users with the content feed with a second level of engagement of a second engagement group of users among the two or more engagement groups of users with the content feed; and
use the first and second levels of engagement with the content feed to select a value associated with the factor for use in modulating a subsequent feed composition of the content feed.

19. The apparatus of claim 18, wherein the cohort is selected to comprise at least one of:
users with similar levels of engagement with the content feed over a pre-specified period; and
users in a member segment of a social network.

20. The apparatus of claim 18, wherein using the first and second levels of engagement with the content feed to select the value of the factor for use in modulating the subsequent feed composition of the content feed comprises:
    selecting the value associated with the factor to produce an amount of change in the subsequent feed composition.

\* \* \* \* \*